United States Patent [19] [11] 4,013,218
King [45] Mar. 22, 1977

[54] SELF-INDICATING THERMOSTAT
[75] Inventor: Jack B. King, Royal Oak, Mich.
[73] Assignee: General Motors Corporation, Detroit, Mich.
[22] Filed: Jan. 29, 1976
[21] Appl. No.: 653,355
[52] U.S. Cl. .............................. 236/34.5; 236/94
[51] Int. Cl.² ........................................ F01P 7/02
[58] Field of Search ............. 236/34, 34.5, 94, 100
[56] References Cited
UNITED STATES PATENTS
3,768,731  10/1973  Lavado ......................... 236/34.5 X Primary Examiner—William E. Wayner
Assistant Examiner—William E. Tapolcai, Jr.
Attorney, Agent, or Firm—K. H. MacLean, Jr.

[57] ABSTRACT

A thermostatically responsive valve for controlling fluid, including a thermally responsive power member for operating the valve and indicator means movable to an operative position indicative of an overheat condition in response to high fluid temperatures. Latch means are provided to prevent movement of the indicator means into the overheat position during an overheat condition when activated by the thermally responsive power member, so that the responsibility of the thermostat can be determined by examination.

5 Claims, 7 Drawing Figures

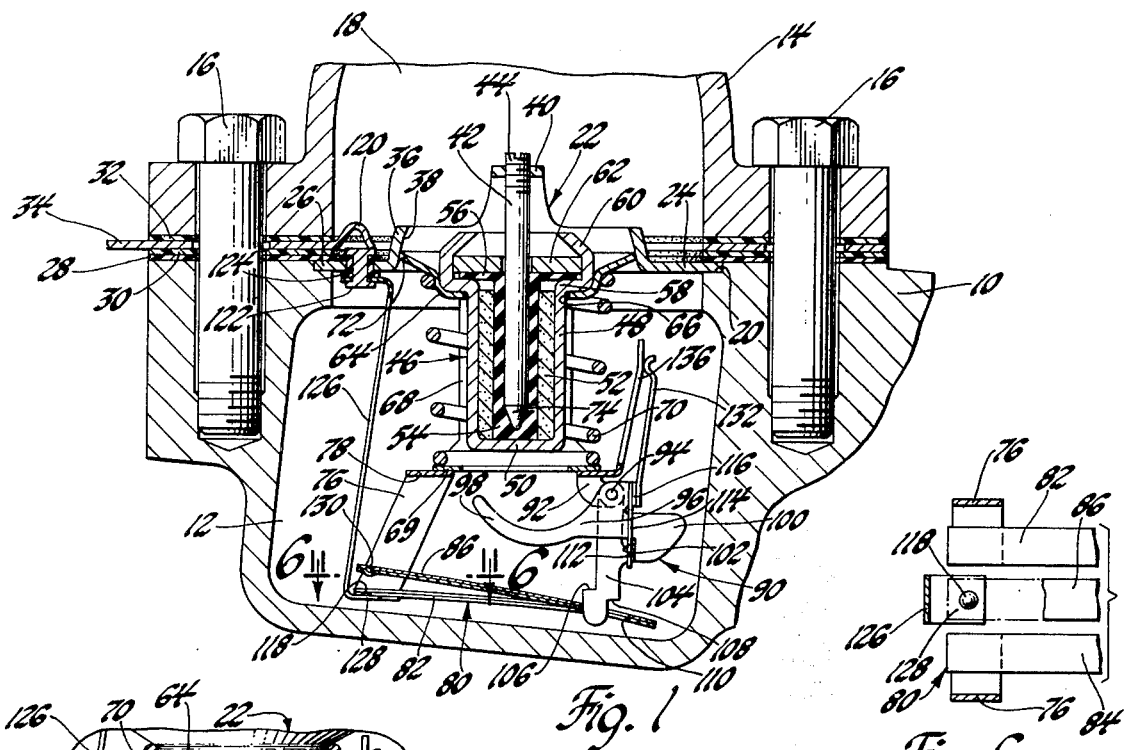
Fig. 1
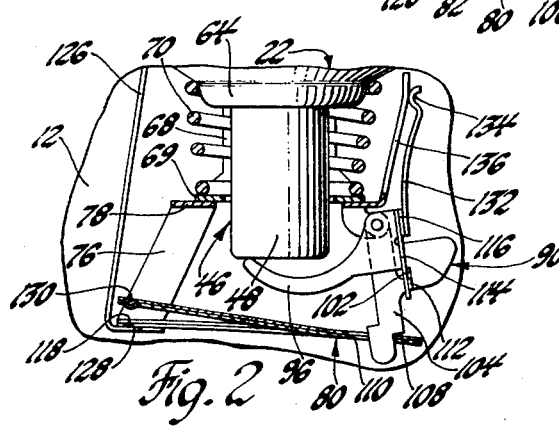
Fig. 2
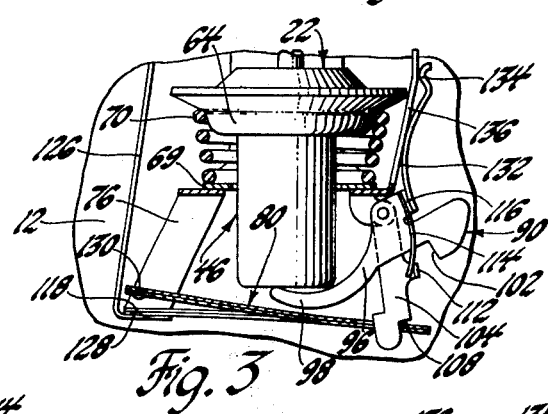
Fig. 3
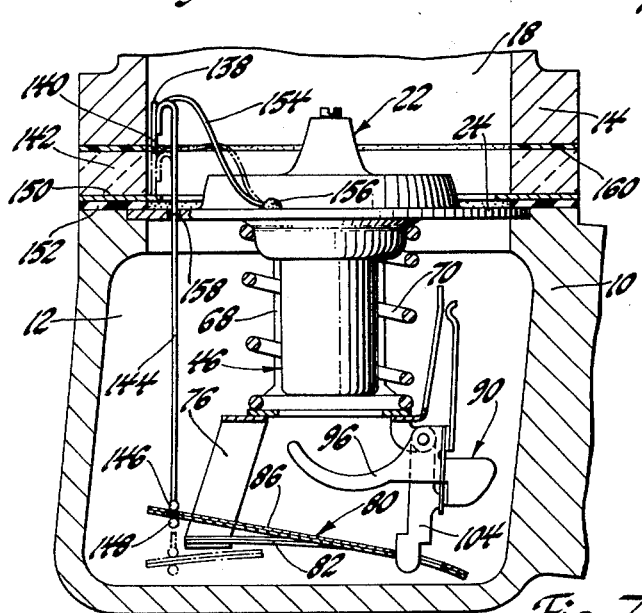
Fig. 7
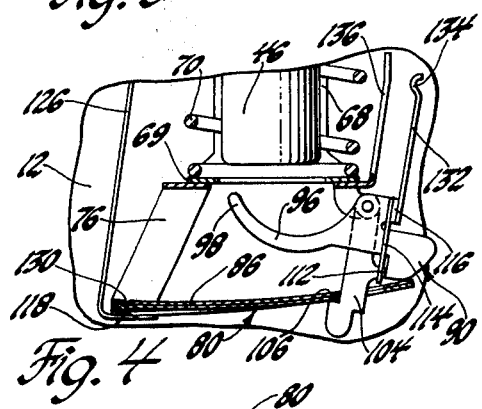
Fig. 4
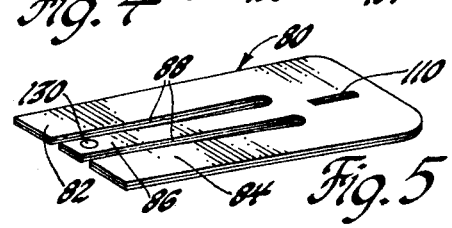
Fig. 5
Fig. 6

SELF-INDICATING THERMOSTAT

This invention relates to a thermally responsive valve and particularly to a valve with an indicating mechanism or assembly responsive to high fluid temperatures to indicate thermostat failure subsequent to an overheat condition.

The subject control valve is particularly applicable to motor vehicles having a liquid cooled internal combustion engine or the like. Prior cooling systems for engines have utilized thermostatically responsive valves normally located at the outlet of the engine cooling passages. The valve controls fluid flow through the engine and an associated heat exchanger so as to maintain engine temperatures within a desired temperature range. For a considerable period of time, the control valve, or thermostat, has utilized a wax pellet type actuator or power means. The actuator basically includes a housing, through the open end of which a rod extends into an interior which is partially filled with wax or like material. When the wax changes from a solid to a liquid, it expands and exerts a force on a piston means, causing it to move from the housing. As the rod moves from the housing, a valving member is made to move away from a valve seat and liquid coolant flow is established.

A problem with wax pellet-type actuators arises due to the tendency of wax to leak from the interior of the housing. Considerable improvement has been made over the years in seal arrangements to maintain the wax within the housing. However, prolonged operation with the wax in the liquid state may eventually result in wax leakage. When wax leaks from the housing interior, the relatively high temperature coolant surrounding the actuator will not produce movement of the rod actuator to open the valve. When the valve is not open, the coolant temperature increases until the "hot" warning light is activated. Continued operation will elevate the system pressure enough to open the relief valve in the radiator cap.

Responsive to the described overheat condition, it has been common practice to replace the thermostat. This practice has been followed because it is rather time-consuming to test thermostats to determine whether the overheat condition was caused by a thermostat failure or by some other cause, such as a low coolant supply in the system. Needless to say, replacement of good thermostats is wasteful. It has been determined that a significant percentage of replaced thermostats subsequent to overheat problems were, in fact, operative and did not need replacement.

The subject coolant valve utilizes a wax pellet-type actuator as previously described. In addition, a valve member and frame support an overheat indicating mechanism or assembly which moves to an overheat indicating condition only when the condition was caused by the thermostat failing. The indicating mechanism latches to the aforesaid warning operative position in response to overheat conditions caused by unresponsiveness of the actuator so that a serviceman may establish that the thermostat is non-functional by visual or electric means.

When overheat conditions are caused by factors other than unresponsiveness of the actuator, a portion of the indicating mechanism follows normal movement of the actuator and prevents movement into a warning operative position. During these conditions, an overheat condition is indicated to the vehicle operator through separate and independent temperature warning means as are currently used on modern vehicles.

Therefore, an object of the present invention is to provide in combination with a thermostatically responsive control valve for fluid flow, a "failed thermostat" indicating assembly which latches into a warning operative position whenever fluid temperatures increase above a predetermined level and the thermally responsive actuator of the valve actuator has not operated in response to the overheat conditions.

A further object of the present invention is to provide in combination with a thermostatically responsive control valve for fluid flow of the type having a wax pellet-type actuator which is operative in response to a change of state of the wax contained within an actuator housing, a failed thermostat indicating assembly normally responsive to operation of the actuator to prevent indicator means from moving into a warning position but which latches the indicator means into the warning position under the influence of overheat temperature levels and the actuator's lack of response thereto.

A still further object of the present invention is to provide in combination with a thermally responsive control valve for fluid flow a failed thermostat indicating assembly which, upon exposure to overheat condition, combined with unresponsiveness of the valve's thermal actuator thereto, will prepare a warning device and circuit for later energization, but which prevents such preparation of the warning device exposed to overheat conditions combined with responsiveness of the actuator to the high temperature.

Further objects and advantages of the present invention will be readily understood from the following detailed description, reference being had to the accompanying drawings in which a preferred embodiment is illustrated.

IN THE DRAWINGS

FIG. 1 is a sectioned view of the thermostat mounted within the outlet passage of an internal combustion engine;

FIG. 2 is a fragmentary sectioned view of the thermostat in an open operative position during normal operation of the engine;

FIG. 3 is a view similar to FIG. 2 but showing the overheat position of the thermostat caused by a factor external to the thermostat;

FIG. 4 is a view similar to FIG. 3 but showing the thermostat and indicating assembly in an overheat mode caused by a non-responsive thermal actuator to high coolant temperatures;

FIG. 5 is a perspective view of the thermally responsive warning indicator shown in FIGS. 1 – 4;

FIG. 6 is a sectioned view taken along section line 6—6 in FIG. 1; and

FIG. 7 is a modification of the warning indicator portion of the thermostat shown in FIG. 1.

In FIG. 1 of the drawings, a portion of an engine block 10 is illustrated which defines a water outlet passage 12 therein. A thermostat housing 14 is attached to the engine block 10 by screw fasteners 16 to define a passage 18 leading to a discharge end portion of the housing 14. A hose is adapted to be connected between the discharge end portion of housing 14 and the inlet of a radiator. After passing through the radiator for cooling, the liquid coolant then is passed by the engine water pump through the engine water passages.

The coolant empties into the outlet passage 12. A thermostat valve 22 is supported at a peripheral edge in a recess 20 in the engine block 10 for flowing liquid coolant from the engine whenever the coolant temperature exceeds a given value. The thermostat valve assembly 22 includes a frame member 24 having a peripheral edge 26 resting in recess 20. Three electrically non-conductive gasket members 28, 30, 32 and a conductive gasket 34 are positioned between the engine block 10 and thermostat housing 14 as shown. They are pressed together by the force of fasteners 16. The conductive member 34 does not touch the fasteners 16 and is insulated by the gaskets 28, 30 and 32 from both the engine block 10 and housing 14. The central portion of the frame member 24 is struck upwardly as shown at numeral 36 to form a flow passage 38 through which coolant passes when the valve is open. In addition to the flow passage 38, a bridge portion 40 of frame 24 is formed across passage 38. The bridge portion 40 is relatively narrow and does not interfere in any significant way with flow through passage 38.

An actuator or power rod 42 having a threaded upper end portion 44 extends through a threaded opening in the central portion of the bridge 40 to support a wax pellet-type actuator 46 of which rod 42 is a part. The actuator 46 includes an elongated cup-shaped housing 48 with a relatively rigid cylindrical wall and a closed bottom end indicated by numeral 50 and an open upper end. Enclosed within the interior of housing 48 and in good heat transfer with the cylindrical housing wall is a quantity of wax material 52. The wax 52 encircles an elastic sleeve-like cup 54 which extends around the lower end of the actuating rod 42. The upper end 56 of the sleeve 54 flares radially outward and is pressed into sealing engagement against a shoulder 58 of housing 48 by a turned-over upper portion 60. A washer 62 between the crimped portion 60 and the cup 54 distributes the pressure against the end of the cup.

An annularly shaped valve member 64 has a central portion and an opening 66 formed to encircle the actuator 46 for support. The fluid within passage 12 and beneath member 64 contacts the wall of housing 48 to transfer heat to the wax 52. A support member 68 having a base 69 forms a support for the lower end of coil spring 70 which operates to perform a closing function. Member 68 extends axially along and outside of the spring 70 and is attached to frame 24. The upper end of the spring 70 is supported by the radially outwardly extending member 64 whose peripheral edge engages the portion 36 when the thermostat is in a closed operative position to block fluid flow through passage 38, as shown in FIG. 1.

During normal warm-up and subsequent operation of the engine, the coolant is heated until the "start to open" temperature is exceeded. Thereafter, the actuator 46 moves downward from the position shown in FIG. 1 to the position shown in FIG. 2, which represents a normal operating position with the engine at design temperature. The actuator 46, as shown in FIG. 1, is moved downward with respect to the bridge 40 by the pressure exerted by the wax 52 within housing 48 during a change in state from solid to liquid. The wax pressure is exerted against the surface of cup 54 and is transformed into an axial force on the rod 42 by action against the conical tip or pointed end 74 of the rod 42.

Supported to the bottom end portion 69 of the member 68 is a failed thermostat indicator assembly including frame member 76 which has an annular portion 78 attached to portion 69. A bimetal switching member 80 is attached at one end and supported by frame 76. The switching member 80 is best shown in FIG. 5 in a flat unstressed condition and includes three arm portions 82, 84, 86, formed and separated one from another by slot means 88 extending axially therein. The bimetal switch member 80 is attached to frame 76 at the leftward ends of arms 82 and 84. The central or intermediate arm 86 is not physically attached to frame member 76.

The bimetal switch 80 is prestressed during attachment of arms 82, 84 to frame 76. Specifically, the arms 82, 84 are biased inward toward one another prior to attachment to the frame by spot welds or other equivalent fastening techniques. This forces the normally planar switch into a slightly non-planar and stressed configuration so that the center arm 86 is pushed upward from the plane of the arm portions 82, 84 when in a given low temperature range and pushed downward when in a given higher temperature range. In the embodiments shown in the drawings, the high expanding side of the bimetal faces downward or is on the bottom of the sandwich and the low expanding side is on the top. As the switch passes from the low temperature range into the higher temperature range, the rightward end is snapped rapidly from its normal downward position (FIGS. 1-3) toward its upward position (FIG. 4). By establishing a desired degree of prestress biasing of arms 82, 84, the bimetal can be made to snap between operative positions at a desired temperature, say 235° F.

As shown in FIG. 1, the bimetal switch member 80 extends from frame 76 toward a latching mechanism which is generally indicated by the numeral 90. The latching mechanism includes a bracket 92 through which a pin 94 extends. Pin 94 pivotally supports an actuator follower member 96 having a portion 98 which extends beneath actuator 46 and is adapted to be engaged by the downward movement of the actuator. The other end 100 of the member 96 has a hook-like projection with surface 102 thereon whose purpose will be more apparent from the description to follow.

A latch lever or arm 104 is supported by the pin 94 and pivotal thereabout at its upper end. The arm 104 has a lower end which is formed with an upward-facing surface 106 on one side and a downward-facing surface 108 on the other. The end of the arm 104 extends through elongated slot means 110 in the free end of the bimetal switch member opposite the supported end. Latching arm 104 includes an offset portion 112 bent at right angles to the plane of the main portion of the arm 104 and adapted to engage surface 102 on follower member 96.

Subsequent to engine startup and when the engine coolant within passage 12 exceeds a start to open temperature, actuator 46 moves downward as the wax 52 therein melts. Resultantly, the bottom portion of the actuator 46 moves through the opening in the base 69 of member 68 to engage follower lever 96. This pivots the follower 96 counterclockwise between the positions in FIGS. 1 and 2.

A leaf-type spring 114 is supported on a portion 116 of follower 96 and extends downward into contact with offset portion 112 of member 104. The engagement of the leaf spring 114 with portion 112 causes the counterclockwise movement of members 96, 104 together. The resultant movement of the latch arm 104 engages the surface 108 with the end of the slot 110 to prevent upward movement of the free right end portion of the bimetal switch 80. Engagement with surface 108 maintains the center arm 86 of the bimetal spaced away from a contact 118. This places the indicator system in an open circuit operative position.

The aforementioned failed thermostat indicating assembly includes the contact 118, conductive gasket member 34 to be used with auxiliary equipment such as a warning light or buzzer which is connected between the gasket and the battery by the serviceman. The conductive gasket 34 has a hooked spring-like portion 120 which bears against an electrical rivet or contact 122 which extends through the frame member 24. The contact 122 is insulated from the frame 24 by an insulating sleeve 124. Attached to the lower end of the contact 122 is a downwardly extending conductive contact support 126 which has an inwardly turned end portion 128 extending between the arms 82, 84 of the bimetal switch member 80, as seen in FIG. 6. Contact 118 is supported on the inwardly turned portion 128 below the free end of arm 86. A dimpled portion 130 on the center arm 86 of the member 80 is spaced from and above contact 118. When in a closed operative position caused by high coolant temperatures in passage 12 and failure of the actuator 46 to respond to the increased temperature, arm 86 and dimpled portion 130 thereon is moved downward against the contact 118. Contact 118 may be in the form of a pointed conical extension so that the projection actually pierces the dimple 130 so that a good electrical contact is made therebetween, irrespective of corrosion on the parts. When contact 118 engages dimple 130, the circuit is prepared for later energization through the members 126, 76, 68 and the frame 24 (hence to the engine block 10).

It should be noted that in the normal operation of the thermostat and indicating assembly shown in FIG. 2, leaf spring 132 is mounted upon portion 116 of follower 96 to resist pivotal counterclockwise movement of the members 96 and 102. The leaf spring 132 has a hooked upper end portion 134 which bears against an extension 136 of the bracket 92 which itself is attached to member 68. When the follower 96 and latch arm 104 rotate about pin 94 in the counterclockwise direction in response to movement of the actuator 46 downward, the spring 132 bears against the extension 136 to resist further counterclockwise rotation. When the actuator 46 again moves upward due to cooling of the engine, the spring 132 rotates the member 96 and lever 104 clockwise back to the position shown in FIG. 1.

In FIG. 3, the combination thermostat and indicating device is shown during a period of engine operation in which the coolant temperature exceeds the normal operating temperature and thus represents an overheat problem. In this case, the overheat problem is not caused by a nonfunctioning actuator 46, as can be seen by its descended position, but instead may be caused by some other factor, such as low coolant level or a nonfunctioning water pump. Under these conditions, the actuator 46 moves further downward than normal, compressing spring 70 and causing extreme counterclockwise pivoting of the follower member 96. The latching arm 104 is limited by slot 110 in its counterclockwise rotation and simultaneously the surface 108 on the arm 104 latches the bimetal switch member 80 in the open operative position shown in FIGS. 1 – 3. Thus, the failed thermostat warning circuit is not permitted to move to a closed operative position. During cooldown, which will occur after the engine is shut off, movement of the actuator upward to the position shown in FIG. 1, permits the follower 96 to pivot clockwise so that surface 102 re-engages with portion 112 of lever 104 to rotate the arm 104 clockwise back to the position shown in FIG. 1.

In FIG. 4, the combination thermostat and failed thermostat indicating device is shown in an operative position assumed when the coolant temperature exceeds the normal operating temperature and the actuator 46 is nonfunctional. The failure of the actuator 46 to respond to increasing temperature is normally caused by leakage of the wax 52 from the housing 48. The actuator 46, therefore, does not engage the end 98 of the follower 96 and consequently the members 96 and 104 are not pivoted counterclockwise. Instead, at some predetermined overheat temperature, say 235° F., the right end of the bimetal switch member 80 moves in snap action upward to the position shown in FIG. 4. This causes the center arm 86 of the bimetal to snap downward and strike the contact 118. The force of the spring 132 falls to zero after the arm 86 of the bimetal moves above surface 108. The pivotal center of the lever assembly, including members 96, 104, 112 and 132, is purposely placed to the left of the center of gravity so that the assembly and latching arm 104 move clockwise and to the left. This positions surface 106 of arm 104 under the bimetal to prevent later movement of the bimetal back to its initial open position shown in FIG. 1. Accordingly, once the combination thermostat and warning device is exposed to overheat conditions accompanied by inadequate response of the thermal actuator, the bimetal switch member is latched into a closed position with the warning circuit prepared to be energized.

In FIG. 7, a modification of the subject combination thermostat and failed thermostat warning mechanism or assembly is shown. The same bimetal switch 80 shown in FIG. 5 is utilized in the modified embodiment. However, a thin metal flag 138 having a pointed projection on its lower edge is also utilized. The flag 138 is supported above a relatively thick and transparent plastic gasket 142 by a rod support 144 which is attached at a lower end to the center arm 86 of the bimetal switch member. The rod 144 employs enlarged portions 146, 148 located on the top and bottom sides, respectively, of the arm 86 so that the rod 144 is moved upward and downward as the center arm moves between its open operative position and its closed warning operative position. A metal gasket 150 placed under the plastic gasket 142 and above an insulating gasket 152 establishes a portion of an electrical indicating circuit. The circuit extends from the engine block 10 through the thermostat frame 24, members 68 and 76 to the bimetal switch member 80. From the switch 80 the circuit extends through rod 144 to flag 138. The inside diameter of the conductive gasket 150 extends into the interior of housing 14 to be engaged by the pointed lower edge 140 of the flag 138 as it moves downward into the overheat warning position shown by broken lines in FIG. 7. A flexible wire 154 extends between rod 144 and frame 24 to insure that an electrical circuit is established therebetween. Solder or other means 156 attaches wire 154 to the frame. The hole 158 in the frame 24 through which rod 144 extends is small enough so that leakage between the rod and the frame is of insignificant quantity to affect engine performance. Also, the pressure differential acting on the cross-sectional area of the rod 144 is insignificant, as the diameter of the rod may be selected small enough that the resultant pressure is insignificant. In addition to the aforementioned parts which differ slightly from the embodiment of FIGS. 1 – 4, a gasket 160 is utilized between the clear plastic gasket 142 and the thermostat housing 14 for sealing purposes.

In the embodiment shown in FIG. 7, the follower 96 and latch member 104 operate the same as in the first embodiment shown in FIGS. 1 – 4. The operation and motion of the center arm 86 of the bimetal member 80 is similar. When the coolant in passage 14 exceeds a predetermined temperature and the actuator 46 does not respond thereto, the rod 144 and flag 138 are moved rapidly downward by downward snap movement of the arm 86 of switch 80. Resultantly, the pointed edge 140 of flag 138 positively engages the conductive gasket 150. This prepares an indicating circuit for subsequent use by a mechanic or serviceman. In addition, the mechanic may observe the flag 138 through the clear plastic gasket 142. In this regard, the face of the flag 138 may be colored a bright color to aid in identification. When the flag is in the downward position shown by the broken lines in FIG. 7, it is indicative that an overheat condition has occurred which was caused by failure of the thermostat actuator 46 to respond to the increased temperature. Therefore, a mechanic will know that the thermostat should be replaced. However, after an overheat condition has been experienced and it is observed that the flag 138 has not moved downward into a visible position through the plastic gasket 142, a mechanic then knows that the overheat condition was not caused by failure of the thermostat to respond to increased temperature and therefore his attention should be directed to other causes which may induce overheat conditions.

Although the embodiments illustrated in the drawings and described in detail heretofore are preferred embodiments, other modifications and variations may be adopted without falling outside the scope of the following claims, which solely define the invention.

What is claimed is as follows:

1. A combination temperature responsive fluid control valve and overheat indicating assembly which provides a warning indication when an overheat condition is caused by unresponsiveness of the control valve to increased temperature, but does not provide an indication otherwise, comprising:
   fluid passage forming means including an apertured frame adapted to be supported so as to intercept fluid flow;
   a movable valve member operably cooperating with said passage forming means to prevent fluid flow through said aperture when in a closed operative position and allowing fluid flow therethrough when moved to a more open operative position;
   a thermally activated power means operably connected to said valve member for moving said valve from its closed operative position to a more open operative position when fluid temperatures exceed a start-to-open temperature;
   said frame supporting a bimetal type overheat warning switch of elongated configuration which is supported at one end portion to permit movement of the opposite second end portion from a first low temperature operative position to a second higher temperature operative position;
   means including a follower arm portion and a latch arm portion, both pivotally mounted with respect to said power means and engaging said power means and said bimetal switch for preventing movement of said second end portion into its second operative position in response to overheat temperature conditions accompanied by responsive movement of said power means to increased fluid temperature and, alternatively, for maintaining said second end portion of said bimetal switch in its second operative position once an overheat condition has occurred caused by failure of said power means to respond to the increased fluid temperature level.

2. A combination temperature responsive fluid control valve and overheat indicating assembly which provides a warning indication when the overheat condition is caused by unresponsiveness of the control valve to increased temperature, but does not provide an indication otherwise, comprising:
   fluid passage forming means including an apertured frame adapted to be supported so as to intercept fluid flow;
   a movable valve member operably cooperating with said passage forming means to prevent fluid flow through said aperture when in a closed operative position and allowing fluid flow therethrough when moved to a more open operative position;
   a thermally activated power means operably connected to said valve member for moving said valve from its closed operative position to a more open operative position when fluid temperatures exceed a start-to-open temperature;
   said frame supporting a bimetal type overheat warning switch of elongated configuration which is supported at one end portion to permit movement of the opposite second end portion from a first low temperature operative position to a second higher temperature operative position;
   said bimetal switch having an elongated opening therethrough in said second end portion;
   means including an operably interconnected follower arm and latch arm pivotally mounted so as to move in response to movements of said power means and to engage said bimetal switch for preventing movement of its second end portion into the second operative position in response to overheat temperature conditions accompanied by responsive movement of said power means to the fluid temperature changes and, alternately, for maintaining the second end portion of said bimetal switch in its second operative position after an overheat condition has occurred accompanied by failure of said power means to respond to the fluid temperature changes;
   said latch arm being pivotally mounted at one end portion with an opposite end portion extending through said elongated opening in said bimetal switch and movable from one end of said elongated opening to the other in response to the movement of said power means as are received and transmitted by said follower arm;
   surfaces formed on opposite sides of said latch arm for alternately engaging said bimetal switch at opposite ends of said elongated opening as said latch arm is pivoted therein to prevent movement of said second end portion of the switch in one direction from a first to a second operative position when the power means responds to increased fluid temperatures corresponding to an overheat condition and to prevent movement of said second end portion of the switch in a second opposite direction from the second to the first operative position when the power means fails to respond to temperature changes.

3. A combination temperature responsive fluid control valve and overheat indicating assembly which provides a warning indication when an overheat condition is caused by unresponsiveness of the control valve to increased temperature, but does not provide an indication otherwise, comprising:

fluid passage forming means including an apertured frame adapted to be supported so as to intercept fluid flow;

a movable valve member operably cooperating with said passage forming means to prevent fluid flow through said aperture when in a closed operative position and allowing fluid flow therethrough when moved to a more open operative position;

a thermally activated power means operably connected to said valve member for moving said valve from its closed operative position to a more open operative position when fluid temperatures exceed a start-to-open temperature;

said frame supporting a bimetal type overheat warning switch of elongated and substantially flat configuration which is supported at one end to permit movement of the opposite second end portion from a first low temperature operative position to a second higher temperature operative position;

said bimetal switch member having elongated slot means extending therethrough from said first end to an intermediate location, thus separating said first end portion of said switch into side by side arm portions capable of independent movement;

all but one of said arm portions being connected to said frame with said one arm portion unattached and free to move in a substantially normal direction to the plane of the switch member as said opposite second end portion of the switch moves in a similar non-planar direction in response to fluid temperature changes;

means including an operably interconnected follower arm portion and latch arm portion, both pivotally mounted with respect to said power means and said bimetal switch and responsive to movements of said power means to engage said bimetal switch for preventing movement of its second end portion into said second operative position in response to overheat temperature conditions accompanied by responsive movement of said power means to the fluid temperature changes and alternately, for maintaining the second end portion of said bimetal switch in its second operative position after an overheat condition has occurred accompanied by failure of said power means to respond to the fluid temperature changes;

circuit means including a selectively activated warning indicator and a conductive support member cooperative with said movable one arm of said bimetal switch to activate said warning indicator in correspondence with movements of said bimetal switch into its second operative position, thereby indicating an overheat condition caused by unresponsiveness of said power means to fluid temperature changes.

4. The control valve and overheat indicating assembly of claim 2 in which said follower arm and latch arm are pivotal about a common axis and support leaf spring means at one end whose other end bears against a stationary extension of said frame to bias said follower and latch arm assembly from the operative position which prevents said second end portion of the bimetal switch from moving to its higher temperature operative position; said follower arm, latch arm and spring means having a center of gravity offset horizontally from said common pivotal axis so as to induce pivotal movement of the assembly and particularly said latch arm so that the latch arm surface engages said second end portion of said bimetal switch so as to prevent movement thereof in said second direction subsequent to an overheat condition as fluid temperatures decrease.

5. The control valve and overheat indicating assembly of claim 3 in which said warning indicator includes flag means operably connected to said one arm of said bimetal switch to be movable therewith from a non-visible position to a visible position when said bimetal switch moves from its first to its second operative position, contact means integrally formed on an edge of said flag to engage a conductor portion of said circuit means when said flag is moved into its visible operative position.

* * * * *